US010616076B2

(12) United States Patent
Mithal

(10) Patent No.: US 10,616,076 B2
(45) Date of Patent: Apr. 7, 2020

(54) NETWORK ASSET MANAGEMENT

(71) Applicant: International Business Machines Corporation, Armonk, NY (US)

(72) Inventor: Akshat Mithal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 15/608,725

(22) Filed: May 30, 2017

(65) Prior Publication Data

US 2018/0351828 A1 Dec. 6, 2018

(51) Int. Cl.
*H04L 12/24* (2006.01)
*G06F 9/455* (2018.01)

(52) U.S. Cl.
CPC .......... *H04L 41/24* (2013.01); *G06F 9/45558* (2013.01); *H04L 41/0226* (2013.01); *G06F 2009/45583* (2013.01); *G06F 2009/45595* (2013.01)

(58) Field of Classification Search
USPC ....................................................... 709/223
See application file for complete search history.

(56) References Cited

U.S. PATENT DOCUMENTS

| | | | |
|---|---|---|---|
| 8,713,180 B2 | 4/2014 | Bakke et al. | |
| 8,725,692 B1 | 5/2014 | Natanzon et al. | |
| 9,071,585 B2 | 6/2015 | Green | |
| 2008/0065835 A1* | 3/2008 | Iacobovici | G06F 12/0817 711/141 |
| 2008/0140910 A1* | 6/2008 | Flynn | G06F 13/426 711/100 |
| 2009/0307396 A1* | 12/2009 | Nogueras | G06F 9/541 710/65 |
| 2010/0011014 A1* | 1/2010 | Odulinski | G06F 16/258 707/E17.006 |
| 2012/0079583 A1* | 3/2012 | Christiansen | G06F 3/061 726/9 |
| 2012/0110281 A1 | 5/2012 | Green et al. | |
| 2013/0239108 A1* | 9/2013 | Lee | G06F 9/45533 718/1 |
| 2014/0143286 A1 | 5/2014 | Knight et al. | |
| 2014/0164571 A1* | 6/2014 | Green | H04L 67/1095 709/219 |
| 2014/0359612 A1* | 12/2014 | D'Amato | G06F 3/0626 718/1 |
| 2015/0234715 A1* | 8/2015 | Knight | G06F 11/1458 707/646 |

(Continued)

FOREIGN PATENT DOCUMENTS

WO 2014078504 A1 5/2014

*Primary Examiner* — Philip J Chea
*Assistant Examiner* — Hassan A Khan
(74) *Attorney, Agent, or Firm* — Kunzler Bean & Adamson

(57) ABSTRACT

The network asset management apparatus includes a receiver module, an inquiry module, a translator module, and a sending module. The receiver module receives a request from a host to manage a network asset. The request has a first command format corresponding to the host. The inquiry module determines a second command format compatible with a target of the request. The translator module translates the request from the first command format to the second command format. The sending module provides the translated request for communication to the target of the request.

15 Claims, 6 Drawing Sheets

(56) References Cited

U.S. PATENT DOCUMENTS

| | | | |
|---|---|---|---|
| 2016/0070652 A1* | 3/2016 | Sundararaman | G06F 3/0619 |
| | | | 711/154 |
| 2016/0154834 A1* | 6/2016 | Friedman | G06F 16/2246 |
| | | | 707/657 |
| 2017/0235802 A1* | 8/2017 | Vully | G06F 16/119 |
| | | | 707/809 |

* cited by examiner

NETWORK ASSET MANAGEMENT

FIELD

The subject matter disclosed herein relates to network storage and more particularly relates to asset management in network storage.

BACKGROUND

An abundance of data is created and used individually and by groups such as companies and businesses. Storage networks are one solution to providing flexible and efficient storage for a wide variety of applications. Some storage networks supply resources in an efficient manner through the operation of virtual machines. Virtual machines provide resources to emulate a wide range of resources for use by local or remote consumers. This allows a consumer to access and consume the amount of resources they need in an efficient manner. Resources may include data storage, processor, operating system, platform, or other devices or services. The resources of a network capable of operating a virtual machine may include resources from a plurality of manufacturers with various formats and structures having various compatibilities one with another.

BRIEF SUMMARY

A network asset management system is disclosed. The network asset management apparatus includes a receiver module, an inquiry module, a translator module, and a sending module. The receiver module receives a request from a host to manage a network asset. The request has a first command format corresponding to the host. The inquiry module determines a second command format compatible with a target of the request. The translator module translates the request from the first command format to the second command format. The sending module provides the translated request for communication to the target of the request.

A method is also disclosed. The method includes intercepting a request from a first host to offload a network asset from a first storage location. The request has a first command format associate with the first host and not supported by the first storage location. The method also includes executing an inquiry at the first storage location to identify a second command format supported by the first storage location. The method also includes generating a translated request having the second command format based on a component parsed from the request. The method also includes providing the translated request to the first storage location to facilitate the offload of the network asset.

A computer program product for providing network asset management is also disclosed. The computer program product includes a computer readable storage medium having program instructions embodied therewith. The program instructions readable/executable by a processor to cause the processor to intercept a request from a first host to offload a network asset from a first storage location. The request having a first command format associated with the first host and not supported by the first storage location. The program instructions readable/executable by the processor are further to cause the processor to execute an inquiry at the first storage location to identify a second command format supported by the first storage location. The program instructions readable/executable by the processor are further to cause the processor to generate a translated request having the second command format based on a component parsed from the request. The program instructions readable/executable by the processor are further to cause the processor to provide the translated request to the first storage location to facilitate the offload of the network asset.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
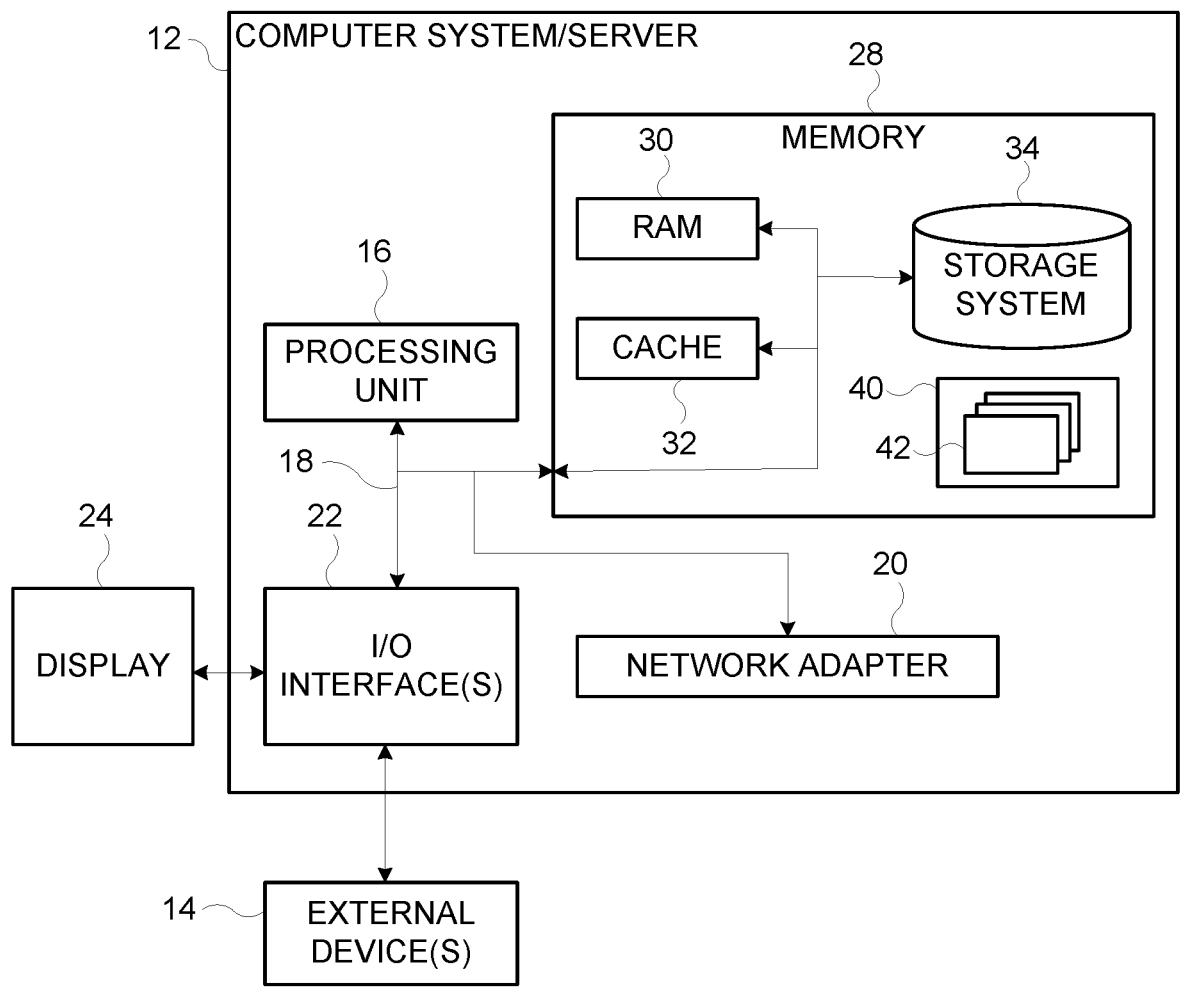
FIG. 1 is a schematic diagram illustrating one embodiment of a computer system which is applicable to implement the embodiments of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer or other programmable apparatus or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server, and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions which identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server, and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed, and executed using a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed, and executed through either a remote-access or a site-to-site VPN. When using the remote-access VPNs the computer program product is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed, and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 shows an exemplary computer system/server 12 which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a storage media (not shown and typically called a "drive"). Although not shown, a magnetic disk drive for reading from and writing to a removable, non-volatile solid state drive, magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data, or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. While not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In one embodiment, the computer system/server 12 is part of or is in communication with a network such as a storage area network (SAN). Communication with other devices, apparatuses, or systems on the network may be handled by the I/O interfaces 22 or the network adapter 20. In some embodiments, the computer system/server 12 includes various modules, described in greater detail below, to manage one or more assets stored on the network. In some embodiments, the computer system/server 12 requests to read or write to an asset stored on the SAN. In other embodiments, the computer system/server 12 independently or in conjunction with other systems or devices, tracks operations on a stored asset, creates thresholds for operations corresponding to the asset, generates requests for management of the asset, analyzes requests for the asset, and/or executes requests to manage the asset on the network. Fewer or more than these functions and other functions may be accomplished wholly or in part by the computer system/server 12.

Figure 2:
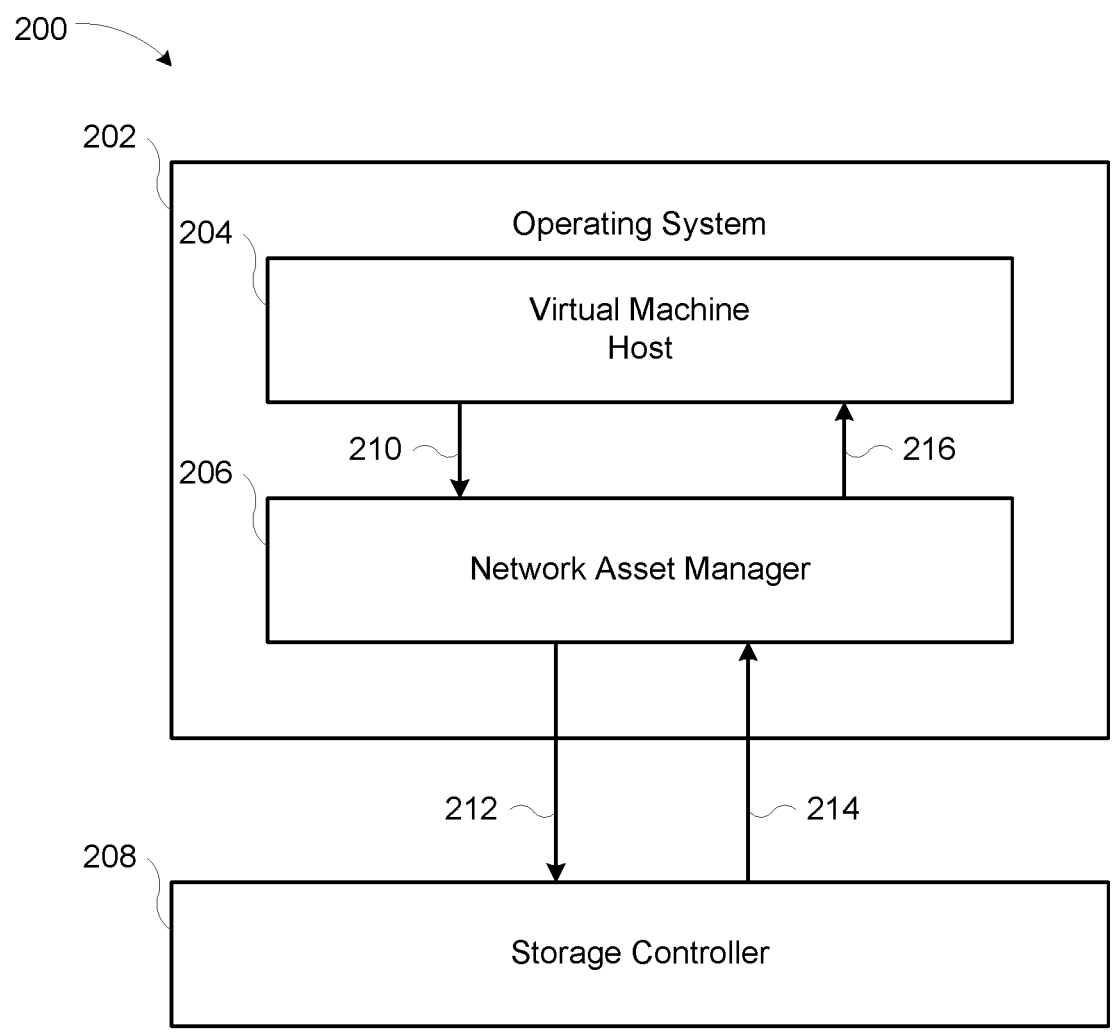
FIG. 2 is a block diagram illustrating one embodiment of an arrangement of an operating system interfacing with a storage controller in accordance with the present invention.

FIG. 2 is a block diagram illustrating one embodiment of an arrangement 200 of an operating system 202 interfacing with a storage controller 208 in accordance with the present invention. In the illustrated embodiment, the operating system 202 includes a virtual machine host 204 and a network asset manager 206. The operating system 202 may be any operating system of any command format or structure. For the purposes of the description below, the operating system 202 is referred to as having a first command format. Other embodiments include other specific command formats.

In the illustrated embodiment, the virtual machine host 204 is a hypervisor. In some embodiments, the virtual machine host 204 is run on the operating system 202. In other embodiments, the virtual machine host 204 is run on hardware of a physical host machine (not shown). In the illustrated embodiment, the virtual machine host 204 communicates with a network asset manager 206.

In some embodiments, the virtual machine host 204 provides a command 210 to the network asset manager 206. In other embodiments, the virtual machine host 204 intends the command 210 to be received by the storage controller 208 but the network asset manager 206 intercepts the command 210 because he command format of the command 210 is not supported by the storage controller 208.

In some embodiments, the command 210 is a command to offload an asset from a storage location managed by the storage controller 208. In another embodiment, the command 210 is a command to initialized a virtual disk at a storage location managed by the storage controller 208. In other embodiments, the command 210 is a command to perform another operation.

In some embodiments, the network asset manager 206 receives the command 210, identifies the command format of the command 210 as a first command format, and translates the command 210 into a second command format supported by the storage controller 208 or a storage array associated with the storage controller 208.

In some embodiments, the virtual machine host 204 performs an inquiry on the storage controller 208 to determine one or more potential command formats compatible with the storage controller 208 and/or associated storage locations. In some embodiments, the network asset manager 206 identifies the second command format by submitting an inquiry to the storage controller 208 or the associated storage location targeted by the virtual machine host 204. In some embodiments, the virtual machine host 204 or the network asset manager 206 sends the inquiry upon detection of the storage controller or storage location being made available to the operating system 202.

In the illustrated embodiment, the network asset manager 206 sends the translated command 212 in the second command format to the storage controller 208. In the illustrated embodiment, the storage controller 208 provides a response 214 in the second command format. In some embodiments, the response 214 is an acknowledgement of completion of the translated command 212 by the storage controller 208. In another embodiment, the response 214 is another communication such as a request for further information, a command to proceed, a command to update a record, etc.

In the illustrated embodiment, the network asset manager 206 receives the response 214 in the second command format and translates the response 214 from the second command format to the first command format. In some embodiments, the translated response 216 is provided to the virtual machine host 204 in the first command format.

In some embodiments, the translation of the command 210 and the response 214 includes parsing of one or more components of the command 210 or response 214. For example, the command 210 in the first command format may include certain components, each of which (or combinations of which), corresponds to equivalent components, or combinations of components, in the translated command 212 in the second command format. In some embodiments, the network asset manager 206 provides a direct translation of the command 210 or the response 214.

In other embodiments, the network asset manager 206 provides a dynamic translation based on a relevant context, a parsing of the combination of components, a nature or state of the virtual machine host 204, the storage controller 208, or other relevant modules or systems, or other variables.

In other embodiments, a portion of the translation process includes generating and sending a response without forwarding translated response to the intended target of the untranslated communication. For example, if a communication requires a response that cannot or will not be generated by the intended target, the network asset manager 206 may generate a response and return it to the sending component to simulate compatibility of the target and source of the communication.

As an overview of one example, the operating system 202 is a Microsoft® proprietary operating system and the virtual machine host is a Hyper-V® proprietary to Microsoft. The command 210 is an Offload Data Transfer (ODX) command having a first format. The storage controller 208 is a VMWare® proprietary storage controller operating with a second command format supporting VMware vSphere® Storage APIs-Array Integration (VAAI) operations on a storage array of the same second command format. The network asset manager 206 receives the ODX command 210 and translates the command to a VAAI command 212. The VAAI command 212 is compatible with the storage controller and the command is successfully completed as intended by the virtual machine host 204.

In order to more fully understand the role of the network asset manager 206, additional details are shared herein for an example in which the ODX/VAAI translation is performed. In the above example, the Hyper-V host 204 performs an inquiry on an array associated with the storage controller 208. In this example, the network asset manager 206 is activated and intercepts the inquiry. The network asset manager 206 then generates a fake Enable Vital Product Data (EVPD) page with an 8F value representing that the storage controller 208 and associated array support an ODX command.

In this example, a read request from a Hyper-V hosted virtual machine (VM) will call an application programming interface (API) FSCTL_OFFLOAD_READ operation from the file system, likely the New Technology File System (NTFS), which would trigger a Populate Token (PT) command. The network asset manager 206 intercepts the PT command and returns an acknowledgement as if the token had been created even though no token is created.

Upon receipt of the acknowledgement, the NTFS initiate a Receive Representation of Data (ROD) Token Information command to fetch the token from the array. In response, the network asset manager 206 intercepts the token fetch command and generates a 512 byte token matching the format expected by the virtual machine host 204. In this example, the fabricated token has details that are unique so as to avoid corresponding to an existing storage array.

On receiving the fabricated token, the virtual machine host 204 sends a Write Using Token (WUT) command containing an address of the destination disk, the token, range descriptors, etc. This triggers a copy command (XCOPY) by mapping parameters from the PT and WUT commands to XCOPY parameters. The XCOPY command is intercepted by the network asset manager 206 and translated to a corresponding VAAI command 212.

In this example, once the VAAI command is completed, the network asset manager 206 intercepts an acknowledgement 214 from the storage controller 208 and translates the acknowledgement 214 into a WUT completion status response 216 which is sent to the virtual machine host 204.

In another example, the virtual machine host 204 is a VMware VSphere hypervisor or host and the storage controller 208 supports Hyper-V ODX command format. In this example, the VMware VSphere host 204 does an inquiry on the storage array corresponding to the storage controller 208. The network asset manager 206 is activated and intercepts the inquiry. The network asset manager 206 generates an EVPD page to simulate a storage array supporting VMware XCOPY operations.

Similar to the previous example described above, in this example, the network asset manager 206 intercepts commands, generates the corresponding responses and information, and translates commands to and from the storage controller 208. For example, the network asset manager 206 generates a command for the storage controller 208 to create and store a PT.

In this example, once the PT is created, the network asset manager 206 receives a confirmation of the creation of the PT. Upon receipt of the confirmation, the network asset manager 206 generates and sends a Receive ROD Token Information (RRTI) command. In response to the RRTI command, the VMware virtual machine host 204 sends the WUT command which the network asset manager 206 passes to the storage controller 208.

In this example, in response to the WUT command, the storage controller 208 copies data from the source disk to the target or destination disk. After completion of the copy, the storage controller 208 provides an acknowledgement to the virtual machine host 204 or the VM application which initiated the XCOPY.

Figure 3:
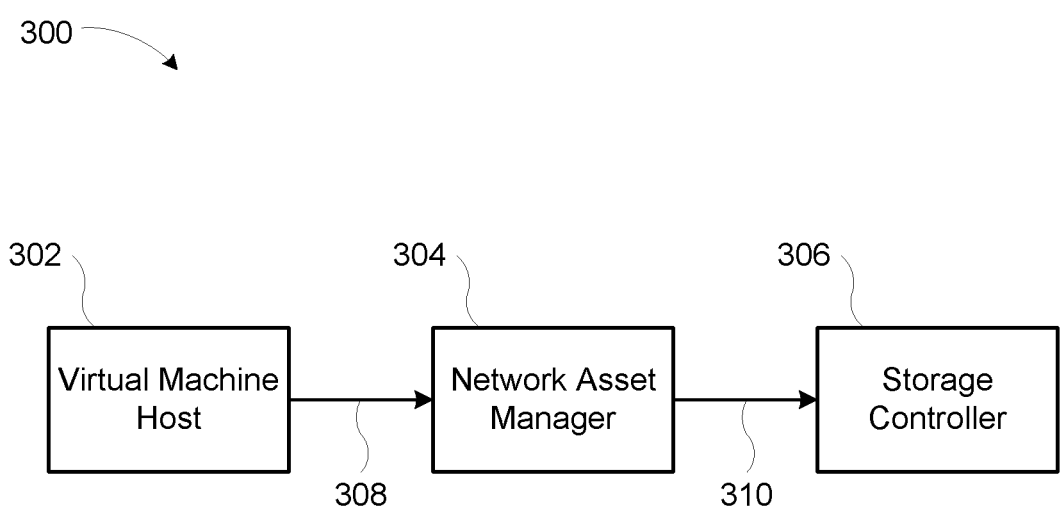
FIG. 3 is a block diagram illustrating one embodiment of an arrangement of a network asset manager integrated with a virtual machine host and a storage controller in accordance with the present invention.

FIG. 3 is a block diagram illustrating one embodiment of an arrangement 300 of a network asset manager 304 integrated with a virtual machine host 302 and a storage controller 306 in accordance with the present invention.

In one example, the virtual machine host 302 is a Microsoft Hyper-V hypervisor. The virtual machine host 302 performs an inquiry 308 on a target storage array supporting only VMware-VAAI and managed by the storage controller 306. The inquiry 308 is intercepted by the network asset manager 304 which fakes a compatibility of the storage array through generation of the corresponding EVPD page with an 8F value indicating compatibility with MS-ODX.

In this example, in response to a command from the virtual machine host 302 to create a virtual hard disk (VHDX), an API-FSCTL_OFFLOAD_WRITE command is triggered by the corresponding NTF S. This WRITE command triggers creation of a Zero ROD token using a WUT command. This command initiates a zeroing on the target storage location of the storage array. The network asset manager 304 intercepts this zeroing write command.

In this example, the network asset manager 304 translates the zeroing command to a VAAI Write Same command 310 which is sent to the storage controller 306. The storage controller 306 zeroes the blocks in the storage array and sends a completion acknowledgement.

In this example, the network asset manager 304 intercepts the acknowledgement, generates a Zero ROD Token successful response, and sends the response to the virtual machine host 302. In some embodiments of this example, the network asset manager 304 is capable of sending multiple Write Same commands against a single Zero ROD Token commands as some embodiments have a block count for the Write Same command of 1megabyte while WUT commands may reach 256 megbytes in some hosts.

In another example, the formats of the virtual machine host 302 and the storage controller 306 are switched. Specifically, the virtual machine host 302 is a VMware VSphere host creating a Virtual Machine Disk (VMDK) triggering a Write Same command on an array supporting only Microsoft ODX command formats and managed by the storage controller 306.

Similar to previous examples, in this example, the network asset manager 304 intercepts an inquiry from the VMware virtual machine host 302 and returns a fake EVPD page indicating that the underlying Microsoft ODX supporting array actually supports VAAI commands. In response, the virtual machine host 302 attempts to create a VMDK with a Write Same command to zero all the intended blocks of the VMDK.

In this example, the network asset manager 304 intercepts this command and translates the Write Same command to a Zero ROD Token WUT command which is sent to the storage controller 306. The network asset manager 304 then awaits acknowledgement from the storage controller 306. Upon receipt of confirmation that the storage location is created and zeroed, the network asset manager 304 generates a Write Same completion response and sends the response to the virtual machine host 302.

While the above examples are specific to certain systems, manufacturers, command formats, etc., some embodiments are capable of operating on other systems or formats. For example, embodiments of the network asset manager 206 are capable of facilitating communication and providing compatibility between Citrix® Xen Cloud (XCP), Kernel Based Virtual Machine (KVM) for Linux®, VirtualBox, OpenVZ, LXC, and others.

Providing compatibility across various command formats enables datacenters and entities providing storage and other virtual services and resources to benefit from various offload protocols which reduce the processor load required to perform traditional buffered or copy operations. This results in less consumption of CPU cycles, memory, and reduces network traffic; all of which result in less cost and load as well as higher efficiency.

Figure 4:
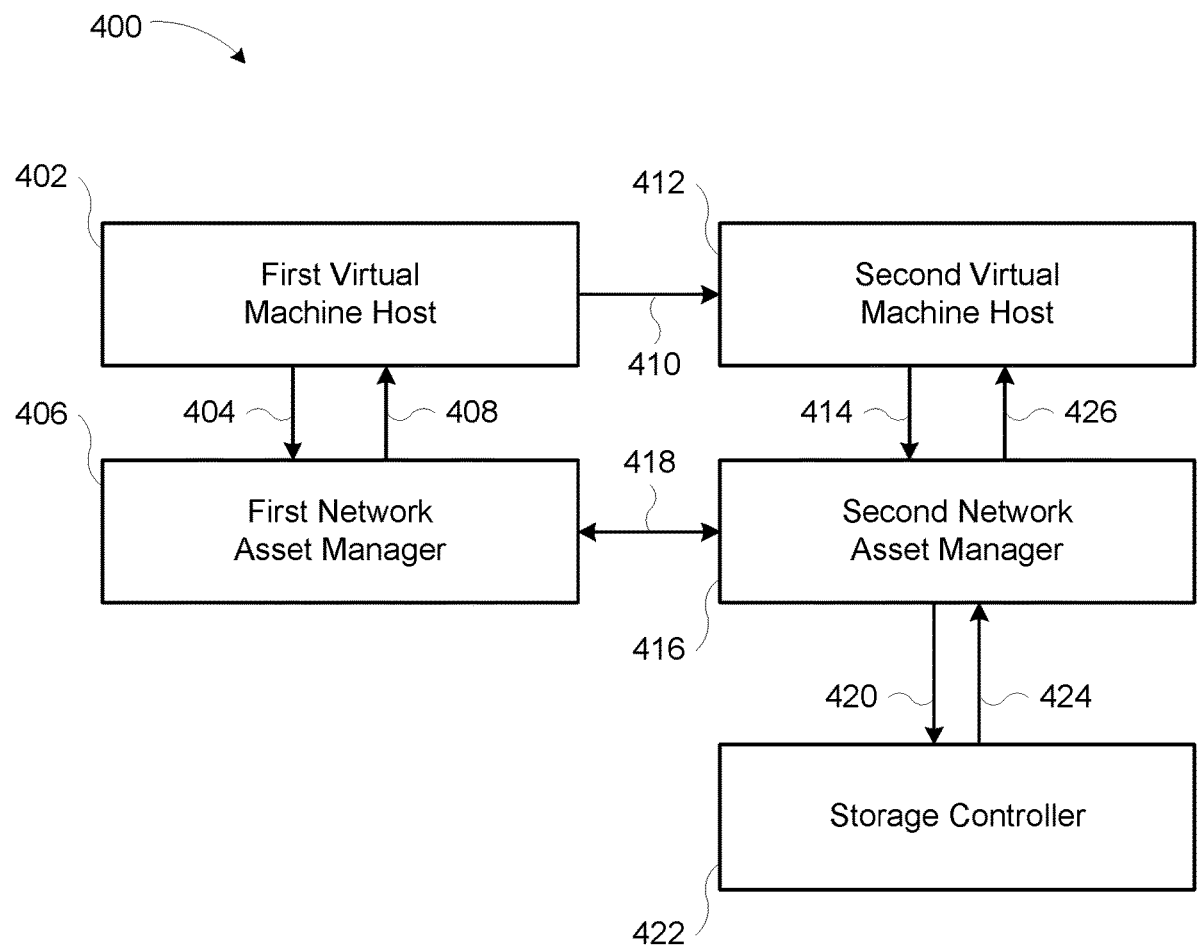
FIG. 4 is a block diagram illustrating one embodiment of an arrangement of a plurality of network asset managers in accordance with the present invention.

FIG. 4 is a block diagram illustrating one embodiment of an arrangement 400 of a plurality of network asset managers 406 and 416 in accordance with the present invention.

In one example of the illustrated arrangement 400, the first virtual machine host 402 and the second virtual machine host 412 are of the same command format. In this example, assume that the first virtual machine host 402 and the second virtual machine host 412 are both Microsoft's Hyper-V hypervisors. In some embodiments, the hosts 402 and 412 are located on a single physical machine. In another embodiment, the hosts 402 and 412 are located on separate machines in a cluster of machines. Other arrangements are contemplated. For example, each of the hosts 402 and 412 may be Type I (native) or Type II (hosted) hypervisors.

In the illustrated embodiment, the first virtual machine host 402 generates an ODX command which is intercepted 404 by the first network asset manager 406. The first network asset manager 406 fabricates and returns 408 the corresponding token or other supplemental data to simulate access to an ODX compatible storage array.

The first virtual machine host 402 receives the token 408 and passes 410 the token to the second virtual machine host 412. In response to receipt of the token, the second virtual machine host 412 generates a WUT command containing the token and attempts to send 414 the command to the storage controller 422.

However, in this example, the storage controller 422 supports only VMware VSphere VAAI XCOPY command formats. To provide the compatibility between the disparate command formats, the second network asset manager 416 intercepts the WUT command 414.

The second network asset manager 416 synchronizes 418 the token with the first network asset manager 406 and translates the WUT command in ODX format to a corresponding VAAI XCOPY command and sends 420 the command to the storage controller 422. The storage controller 422 receives and executes the VAAI XCOPY command and returns 424 an acknowledgement of the completion of the VAAI XCOPY.

The acknowledgement sent 424 by the storage controller 422 is intercepted by the second network asset manager 416. The second network asset manager 416 translates the XCOPY acknowledgement into an ODX acknowledgement which is sent 426 to the second virtual machine host 412.

While the above example is directed towards a specific example involving a specific set of proprietary systems, other systems and formats may be included and are contemplated herein.

Figure 5:
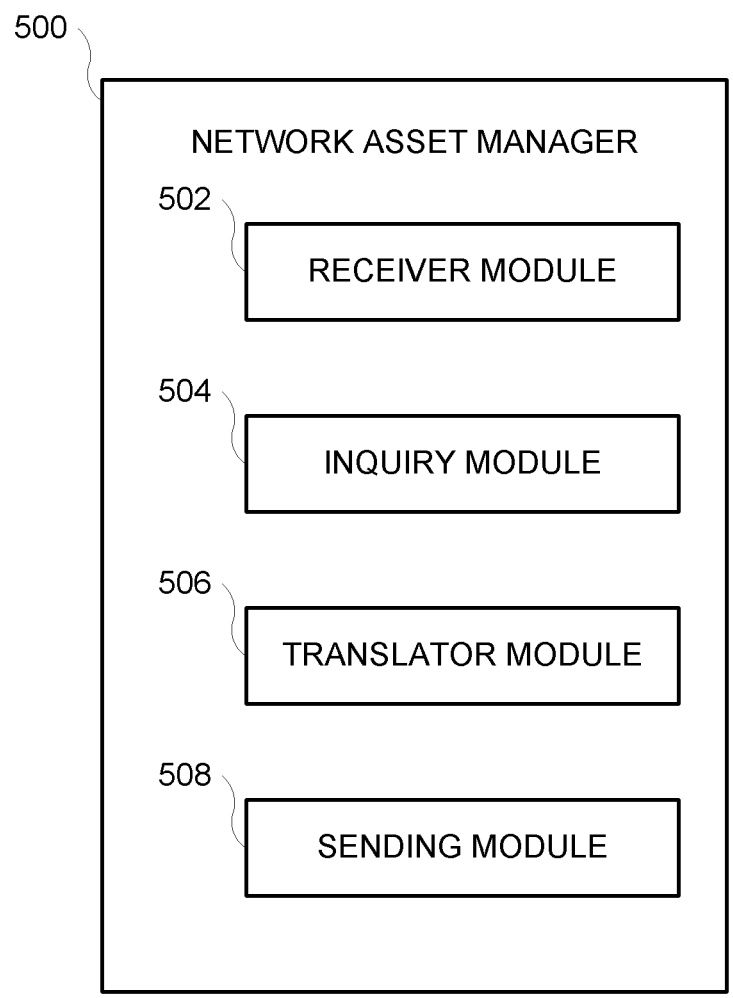
FIG. 5 is a block diagram illustrating one embodiment of a network asset manager in accordance with the present invention.

FIG. 5 is a block diagram illustrating one embodiment of a network asset manager 500 in accordance with the present invention. The illustrated embodiment, the network asset manager 500 includes a receiver module 502, an inquiry module 504, a translator module 506, and a sending module 508.

In some embodiments, the receiver module 502 receives requests, commands, and other communications from a first host (i.e. virtual host machine 204 of FIG. 1) to manage a network asset. The network asset may include storage for data on a block level or file level, CPU cycles, network bandwidth, or other assets.

In some embodiments, the receiver module 502 is capable of intercepting and interpreting one or more command formats used by any number of hypervisors, operating system, or applications. In some embodiments, the receiver module 502 intercepts communications by rerouting communication from an element, such as a virtual machine host or storage controller as discussed above, through the network asset manager 500.

In some embodiments, the inquiry module 504 determines a command format associated with an element with which the network asset manager 500 is in communication. In one embodiment, the inquiry module 504 generates an inquiry and sends it to a storage controller to determine a command format supported by the storage controller and the associated storage array. In some embodiments, the inquiry module 504 intercepts an inquiry and passes the intercepted inquiry along to the storage controller.

The inquiry module 504 or receiver module 502 then receives the response from storage controller and determines a command format supported by the storage controller. In some embodiments, the inquiry module 504 forwards the response from the storage controller to the translator module 506 for translation and forwarding of the translated response by the sending module 508.

In some embodiments, the inquiry module 504 further determines a command format of a network asset that is a target of a read or write command from the virtual machine host. For example, if the virtual machine host is attempting to execute a data offload from one storage location to another, the inquiry module 504 may determine the command format supported by the storage control associated with the storage location currently storing the data as well as the command format supported by at the storage location targeted to receive the data in the offload.

Some embodiments of the translator module 506 translate the communication received at the receiver module 502 and the inquiry module 504 from a first command format to a second command format determined by the inquiry module 504.

In some embodiments, the translator module 506 provides a direct translation from the received communication in a first command format to an equivalent communication in a second command format. In other embodiments, the translator module 506 provides a dynamic translation based on a relevant context, a parsing of the combination of components, a nature or state of the source or target of the communication, the subject of the communication, or other relevant modules or systems, or other variables.

In some embodiments, the translator module 506 interprets the communication received at the receiver module 502 and generates a corresponding response without translating the incoming communication or passing the communication along. For example, if the received communication is a request for a token, the translator module 506 may recognize that a token is a proper response but determines that a token should be generated by the network asset manager 500 to fulfill the response.

In some embodiments, the translator module 506 generates supplemental data to respond to a communication. In other embodiments, the translator module 506 provides supplemental data in the form of cryptographic keys, identifiers, or other information in response to the communication received at the receiver module 502.

Some embodiments of the sending module 508 receive the translated command or communication from the translator module 506 and send the translated communication to the intended target. In some embodiments, the sending module 508 adds an identifier, timestamp, or other information to suitably mimic a communication compatible with the target of the communication.

Figure 6:
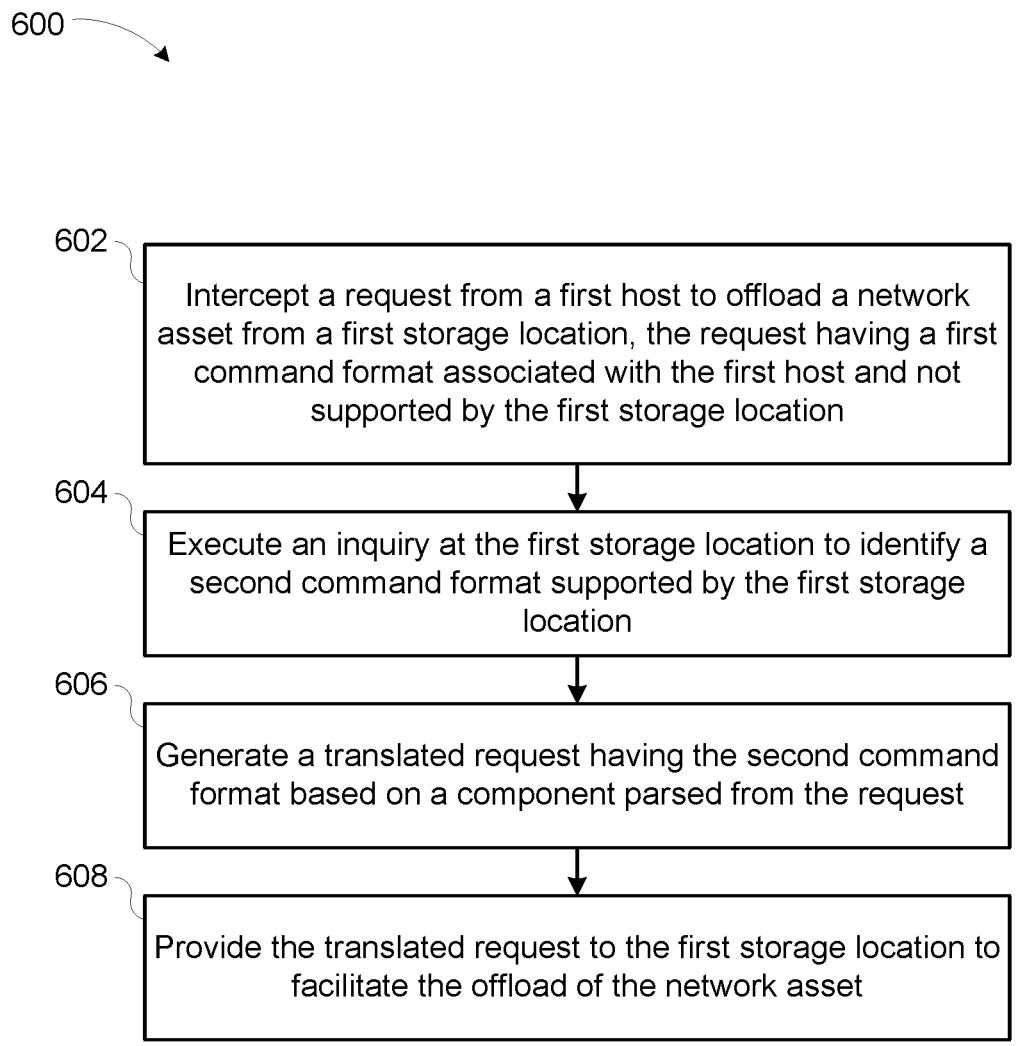
FIG. 6 is a schematic flow chart diagram illustrating one embodiment of a method in accordance with the present invention.

FIG. 6 is a schematic flow chart diagram illustrating one embodiment of a method 600 in accordance with the present invention. At block 602, the method 600 includes intercepting a request from a first host to offload a network asset from a first storage location. The request has a first command format associated with the first host and not supported by the first storage location.

In some embodiments, the first command format is not supported by the first storage location because the first storage location is part of a hybrid storage facility and runs an operating system not compatible with the first command format or includes a storage controller which does not support the first command format. In another embodiment, an operation system of the first host and an operating system of the first storage location are incompatible. In other embodiments, other components of the arrangement of components are incompatible due to operating command formats that are not mutually supported.

In some embodiments, the first host is a first virtual machine host or a first hypervisor. In other embodiments, the first storage location is a location on a storage array managed by a storage controller.

In some embodiments, the first host is a proprietary host as described above and the first storage location is not compatible with the proprietary command format of the host. In other embodiments, the storage location operates a second proprietary command format that is incompatible with the proprietary command format of the host.

At block 604, the method 600 includes executing an inquiry at the first storage location to identify a second command format supported by the first storage location. In some embodiments, the inquiry generates a response of a compatible command format for communication with the storage location. In other embodiments, the inquiry generates a response with a plurality of compatible command formats for communicating with the storage location.

In some embodiments, communication with the storage location is achieved through communication with a storage controller. In some embodiments, the storage controller is associated with a plurality of storage locations. In some embodiments, the storage controller is associated with a plurality of storage location each having a plurality of compatible command formats which may or may not be compatible with one another.

At block 606, the method 600 includes generating a translated request having the second command format based on a component parsed from the request. In some embodiments, the translated request includes an element directly translated from the request, an element not directly translated from the request, or a combination of directly translated and indirectly translated elements.

At block 608, the method 600 includes providing the translated request to the first storage location to facilitate the offload of the network asset. In some embodiments, the translated request is sent to the first storage location as if it had come directly from the first host. In some embodiments, the translated request may appear to the first storage location as if the first host had a command format compatible with that of the storage location.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network asset management apparatus comprising:
a processor to execute:
    a receiver module that receives a request from a host to manage a network asset, the request having a first command format corresponding to the host;
    an inquiry module that determines a second command format compatible with a target of the request;
    a translator module that translates the request from the first command format to the second command format and generates supplemental data comprising a cryptographic element; and
    a sending module that provides the translated request for communication to the target of the request and provides one or more fake responses to the host in the first command format.

2. The apparatus of claim 1, wherein the host is a virtual machine host and the target is a storage controller.

3. The apparatus of claim 2, wherein a first instance of the network asset management apparatus is associated with the virtual machine host and a second instance of the network asset management apparatus is associated with a second virtual machine host.

4. The apparatus of claim 1, wherein the request to manage the network asset comprises a request to initiate an offload of the network asset from the target, the target comprising a storage location of the network asset.

5. The apparatus of claim 1, wherein the inquiry module determines the second format compatible with the target of the request from a response to an inquiry on the target by the inquiry module.

6. The apparatus of claim 1, wherein the sending module further provides a generated response to the host.

7. A method comprising:
    intercepting a request from a first host to offload a network asset from a first storage location, the request having a first command format associated with the first host and not supported by the first storage location;
    executing an inquiry at the first storage location to identify a second command format supported by the first storage location;
    generating a translated request having the second command format based on a component parsed from the request and having supplemental data comprising a cryptographic element;
    providing one or more fake responses to the first host in the first command format; and
    providing the translated request to the first storage location to facilitate the offload of the network asset.

8. The method of claim 7, further comprising receiving a response from the first storage location corresponding to the inquiry, the response specifying the second command format.

9. The method of claim 8, wherein the response from the first storage location specifies a plurality of command formats compatible with the first storage location.

10. The method of claim 7, further comprising bypassing the generation of the translated request in response to a determination that the second command format is compatible with the first command format.

11. The method of claim 7, wherein generating the supplemental data comprises intercepting a communication and generating a communication response to simulate compatibility between the first command format of the first host and the second command format of the first storage location.

12. The method of claim 7, wherein generating the translated request further comprises generating a request to initialize a virtual disk at a second storage location.

13. The method of claim 7, further comprising synchronizing a first network asset management apparatus with a second network asset management apparatus.

14. A computer program product for providing network asset management, the computer program product comprising a non-transitory computer readable storage medium having program instructions embodied therewith, the program instructions readable/executable by a processor to cause the processor to: intercept, by the processor, a request from a first host to offload a network asset from a first storage location, the request having a first command format associated with the first host and not supported by the first storage location; execute, by the processor, an inquiry at the first storage location to identify a second command format supported by the first storage location; generate, by the processor, a translated request having the second command format based on a component parsed from the request and having supplemental data comprising a cryptographic element; provide, by the processor, one or more fake responses to the first host in the first command format; and provide, by the processor, the translated request to the first storage location to facilitate the offload of the network asset.

15. The computer program product of claim 14, wherein generating, by the processor, the supplemental data comprises intercepting a communication and generating a communication response to simulate compatibility between incompatible command formats.

* * * * *